United States Patent
Liu et al.

(10) Patent No.: US 10,864,599 B2
(45) Date of Patent: Dec. 15, 2020

(54) LOCATION OF IMAGE PLANE IN A LASER PROCESSING SYSTEM

(71) Applicant: ELECTRO SCIENTIFIC INDUSTRIES, INC., Portland, OR (US)

(72) Inventors: Yuan Liu, Portland, OR (US); Honghua Hu, Portland, OR (US); Jim Brookhyser, Portland, OR (US); Guangyu Li, Portland, OR (US); Brandon Bilyeu, Portland, OR (US); Kurt Eaton, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 186 days.

(21) Appl. No.: 16/067,711

(22) PCT Filed: Mar. 17, 2017

(86) PCT No.: PCT/US2017/022987
§ 371 (c)(1),
(2) Date: Jul. 2, 2018

(87) PCT Pub. No.: WO2017/161284
PCT Pub. Date: Sep. 21, 2017

(65) Prior Publication Data
US 2019/0001434 A1 Jan. 3, 2019

Related U.S. Application Data

(60) Provisional application No. 62/309,759, filed on Mar. 17, 2016.

(51) Int. Cl.
*B23K 26/02* (2014.01)
*B23K 26/03* (2006.01)
(Continued)

(52) U.S. Cl.
CPC ............ *B23K 26/032* (2013.01); *B23K 26/00* (2013.01); *B23K 26/0626* (2013.01);
(Continued)

(58) Field of Classification Search
CPC .... B23K 26/032; B23K 26/04; B23K 26/046; B23K 26/0613; B23K 26/0622;
(Continued)

(56) References Cited

U.S. PATENT DOCUMENTS

| 5,751,585 A | 5/1998 | Cutler et al. |
| 5,798,927 A | 8/1998 | Cutler et al. |

(Continued)

FOREIGN PATENT DOCUMENTS

| WO | WO94/15238 | 7/1994 |

OTHER PUBLICATIONS

PCT/US2017/022987, international search report dated May 23, 2017, 2 pages.
PCT/US2017/022987, written opinion, 4 pages.

*Primary Examiner* — Hung D Nguyen

(57) ABSTRACT

Disclosed is a method and an apparatus to process a workpiece including producing a first beam of laser energy characterized by a first spatial intensity distribution. A first workpiece is processed using the first beam of laser energy to form a plurality of features at a first distance between the scan lens and the first workpiece and forming a second features at a second distance. The method includes determining which of the plurality of features has a shape that most closely resembles the shape of the first spatial intensity distribution and setting a process distance as the distance that produced that feature. Using this process distance, a surface of a second workpiece is processed using second beam of laser energy with a second spatial intensity distribution.

13 Claims, 1 Drawing Sheet

(51) Int. Cl.
*B23K 26/082* (2014.01)
*B23K 26/00* (2014.01)
*B23K 26/384* (2014.01)
*B23K 26/06* (2014.01)
*B23K 26/073* (2006.01)
*B23K 26/08* (2014.01)

(52) U.S. Cl.
CPC .......... *B23K 26/073* (2013.01); *B23K 26/082* (2015.10); *B23K 26/384* (2015.10)

(58) Field of Classification Search
CPC ............ B23K 26/0624; B23K 26/0626; B23K 26/0639; B23K 26/0648; B23K 26/066; B23K 26/0665; B23K 26/0676; B23K 26/073; B23K 26/08; B23K 26/0807; B23K 26/082; B23K 26/0823; B23K 26/083; B23K 26/0853; B23K 26/0861; B23K 26/0876; B23K 26/361; B23K 26/364; B23K 26/367; B23K 26/382; B23K 26/384; B23K 26/389; B23K 26/40

USPC .............................. 219/121.6, 121.61–121.82
See application file for complete search history.

(56) References Cited

U.S. PATENT DOCUMENTS

| | | |
|---|---|---|
| 5,847,960 A | 12/1998 | Cutler et al. |
| 6,706,999 B1 | 3/2004 | Barrett et al. |
| 7,605,343 B2 | 10/2009 | Lei et al. |
| 8,680,430 B2 | 3/2014 | Unrath |
| 8,847,113 B2 | 9/2014 | Unrath et al. |
| 2003/0102291 A1 | 6/2003 | Liu et al. |
| 2004/0017560 A1* | 1/2004 | Liu ........................ B41J 2/1634 356/213 |
| 2006/0037949 A1 | 2/2006 | Giloh |
| 2009/0242526 A1 | 10/2009 | Baldwin |
| 2010/0059490 A1 | 3/2010 | Unrath et al. |
| 2014/0083983 A1 | 3/2014 | Zhang et al. |
| 2016/0207143 A1* | 7/2016 | Chen ..................... B23K 26/38 |
| 2016/0370614 A1* | 12/2016 | Blanchette ............ G02F 1/1309 |
| 2017/0304946 A1* | 10/2017 | Shibazaki .......... B23K 26/0626 |

* cited by examiner

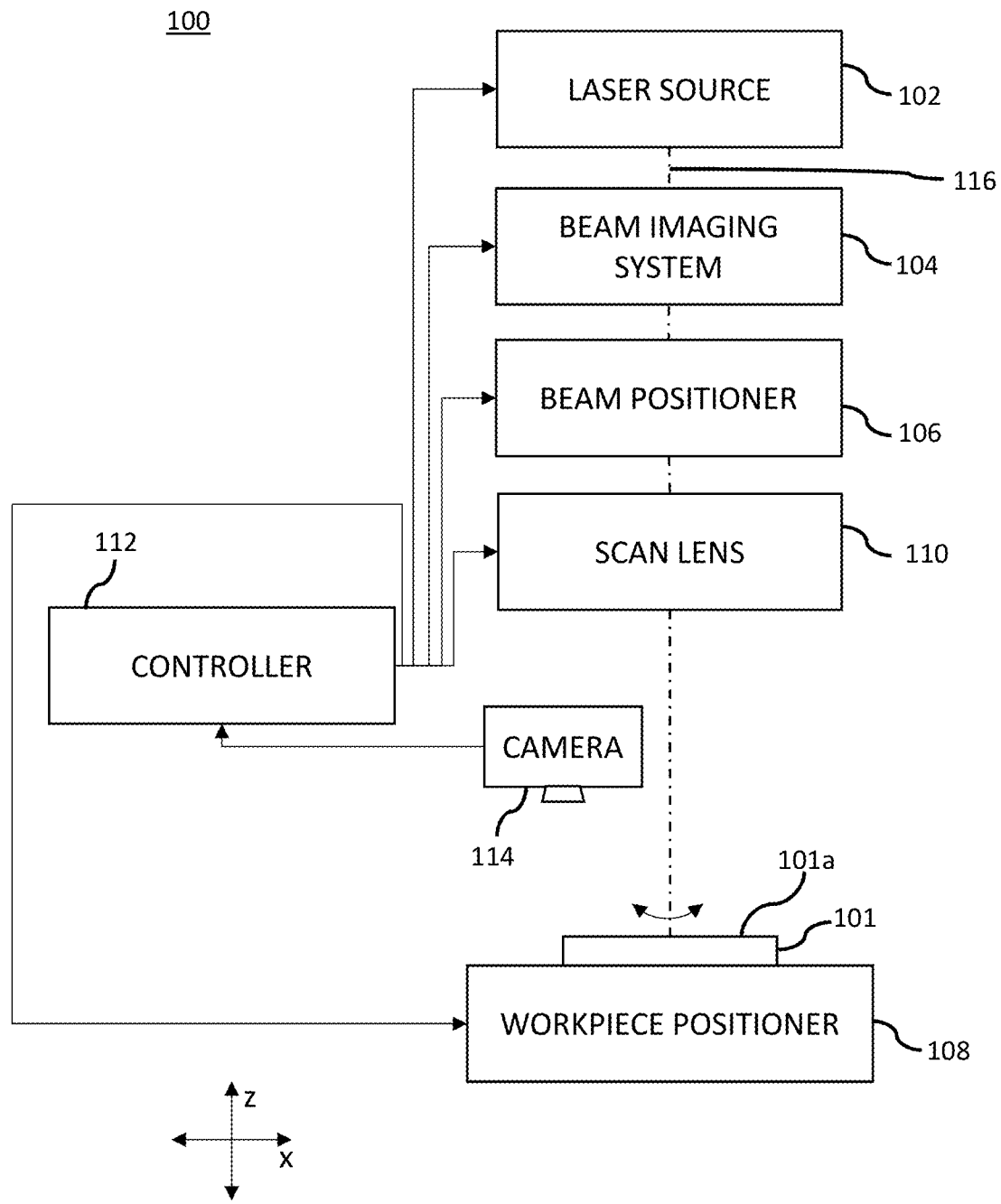

LOCATION OF IMAGE PLANE IN A LASER PROCESSING SYSTEM

CROSS REFERENCE TO RELATED APPLICATION

This application is PCT/US2017/022987 National Phase in US which is claims priority benefit from U.S. Provisional Application No. 62/309,759, filed Mar. 17, 2016, which is herein incorporated by reference in their entirety.

BACKGROUND

I. Technical Field

Embodiments described herein relate generally to location of an image plane and, more particularly, to methods and apparatus for locating an image plane in a laser processing system.

II. Technical Background

In laser processing systems such as those that drill vias in workpieces (e.g., printed circuit boards) using known "percussion" drilling techniques, a laser beam is typically spatially clipped, shaped or otherwise imaged using a circular aperture and, thereafter, is focused by a scan lens and directed onto the surface of the workpiece. Typically, the spatial intensity characteristics of the imaged laser beam will be optimal for laser ablation at the image plane associated with the aperture. Thus, when the workpiece surface has a predetermined spatial relationship with an image plane (e.g., when the workpiece surface and the image plane are coplanar or are at least substantially so, given the precision and accuracy with which scan lens and workpiece are positioned relative to one another), the aperture is considered to be "imaged" at the workpiece surface, and features formed in the workpiece will have desirable geometric characteristics (e.g. size, shape, depth, etc.).

One method for finding the image plane requires the user to experiment with the laser system by ablating a test pattern in the workpiece using a laser beam (i.e., which has been clipped using a circular aperture) and then visually judging whether certain geometric characteristics (e.g. size, shape, depth, etc.) of the test pattern are acceptable. Often, the experiment is performed multiple times, and the user varies the distance between the workpiece surface and the scan lens for each experiment. Test patterns obtained from experiments performed under the various distances are visually compared to determine which test pattern has the best geometric characteristics. The plane in which workpiece surface was present during the experiment that produced the test pattern judged to have the best geometric characteristics is then considered to be the image plane.

To reduce the number of experiments that might otherwise be performed, the optical properties of the laser beam, aperture and scan lens of the laser system can be initially simulated to estimate the distance (also denoted herein as "$\Delta z$") between the image plane and the plane (orthogonal to an axis along which the beam propagates) in which the imaged laser beam has a minimum spot size (i.e., largest center radiance). Once $\Delta z$ is estimated, the system user adjusts the distance between the scan lens and the workpiece surface, e.g., by actuating a stage supporting the scan lens or the workpiece) to locate the workpiece surface at the plane of minimum spot size, and then adds an offset equal to $\Delta z$ to move the workpiece surface to the (nominal) image plane. The laser beam power can also be adjusted to compensate for the changed position of the workpiece surface relative to the scan lens. The test patterns can then be ablated during an experiment in which the workpiece surface is positioned at the nominal image plane, and a few experiments in which the workpiece surface is positioned slightly above and/or slightly below the nominal image plane to confirm the optimal placement of the workpiece surface.

While useful, the simulation technique discussed above is not without its drawbacks. For example, the software required to simulate the laser system and estimate $\Delta z$ can be expensive and may not be easily integrated into a typical laser processing system. Also, performing the simulation requires an in-depth knowledge of optics, which a system user might not possess. In addition, test patterns ablated in the workpiece are generally round in shape, even when the distance between the scan lens and the workpiece surface changes, and adjusting the laser beam power can change the size and depth of features in an ablated test pattern. Therefore, it can be a difficult and time consuming process to precisely identify the test pattern that was formed when the workpiece surface was in at image plane.

SUMMARY

Disclosed herein is a method and an apparatus adapted to perform the method of processing a workpiece using a laser processing system having a scan lens. The method includes producing a first beam of laser energy characterized by a first spatial intensity distribution having a non-circular perimeter shape at the focal point of the beam when viewed in a plane that is orthogonal to a path along which the beam of laser energy propagates.

A first workpiece is processed using the first beam of laser energy. This processing comprises forming a plurality of features in the first workpiece, wherein a first distance between the scan lens and the first workpiece during the forming of one of the plurality of features is different from a second distance between the scan lens and the first workpiece during the forming of at least one other of the plurality of features.

The method further includes determining which of the plurality of features has a shape that most closely resembles the shape of the first spatial intensity distribution and setting a process distance as the distance between the scan lens and the first workpiece during the forming of the feature having the shape that most closely resembles the shape of the first spatial intensity distribution. An imaging plane is determined to be a plane at the process distance from the scan lens to a plane orthogonal to the path along which the beam of laser energy propagates.

A surface of a second workpiece is disposed at substantially the image plane. A second beam of laser energy is generated to form a modulated beam of laser energy characterized by a second spatial intensity distribution different from the first spatial intensity distribution. The surface of a second workpiece, disposed at the image plane, using the modulated beam of laser energy characterized by the second spatial intensity distribution is processed.

BRIEF DESCRIPTION OF THE DRAWINGS

FIG. 1—A schematic depicting the physical elements, of an embodiment, for locating an image plane in a laser processing system.

DETAILED DESCRIPTION

I. Introduction

Example embodiments are described herein with reference to the accompanying drawings. Unless otherwise expressly stated, in the drawings the sizes, positions, etc., of components, features, elements, etc., as well as their relative distances, are not necessarily to scale, but may be exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges there between. Unless indicated otherwise, terms such as "first," "second," etc., are only used to distinguish one element from another. For example, one node could be termed a "first node" and similarly, another node could be termed a "second node", or vice versa. The section headings used herein are for organizational purposes only and are not to be construed as limiting the subject matter described.

Unless indicated otherwise, the term "about," "thereabout," etc., means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "below," "beneath," "lower," "above," and "upper," and the like, may be used herein for ease of description to describe one element's or feature's relationship to another element or feature, as illustrated in the FIGS. It should be recognized that the spatially relative terms are intended to encompass different orientations in addition to the orientation depicted in the FIGS. For example, if an object in the FIGS. is turned over, elements described as "below" or "beneath" other elements or features would then be oriented "above" the other elements or features. Thus, the exemplary term "below" can encompass both an orientation of above and below. An object may be otherwise oriented (e.g., rotated 90 degrees or at other orientations) and the spatially relative descriptors used herein may be interpreted accordingly.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

It will be appreciated that many different forms and embodiments are possible without deviating from the spirit and teachings of this disclosure and so this disclosure should not be construed as limited to the example embodiments set forth herein. Rather, these examples and embodiments are provided so that this disclosure will be thorough and complete, and will convey the scope of the disclosure to those skilled in the art.

II. System Overview

FIG. 1 schematically illustrates laser processing system, in accordance with one embodiment of the present invention, which is configured to process a workpiece using an imaged beam of laser energy. As will be described in greater detail below, the imaged beam of laser energy is created by illuminating an aperture, mask, etc., with a beam of laser energy, so as to project an image of the aperture, mask, etc., onto the workpiece to be processed.

Generally the processing is accomplished, either in whole or in part, by irradiating the workpiece with laser radiation, to heat, melt, evaporate, ablate, crack, discolor, polish, roughen, carbonize, foam, or otherwise modify one or more properties or characteristics (e.g., chemical composition, crystal structure, electronic structure, microstructure, nanostructure, density, viscosity, index of refraction, magnetic permeability, relative permittivity, etc.) of one or more materials from which the workpiece is formed. Such materials may be present at an exterior surface of the workpiece prior to or during processing, or may be located within the workpiece (i.e., not present at an exterior surface of the workpiece) prior to or during processing. Specific examples of processes that may be carried by the illustrated apparatus include via drilling, perforating, welding, scribing, engraving, marking (e.g., surface marking, sub-surface marking, etc.), cutting, laser-induced forward transfer, cleaning, bleaching, bright pixel repair (e.g., color filter darkening, modification of OLED material, etc.), decoating, surface texturing, etc. Thus, features that may be formed on or within workpieces, as a result of the processing, can include openings, slots, vias (e.g., blind vias, through vias, slot vias), grooves, trenches, scribe lines, kerfs, recessed regions, conductive traces, ohmic contacts, resist patterns, indicia (e.g., comprised of one or more regions in or on the workpiece having one or more visually, textually, texturally, etc., distinguishing characteristics), or the like or any combination thereof. When formed as openings, vias, etc., such features can have any suitable or desirable shape (e.g., circular, elliptical, square, rectangular, triangular, annular, or the like or any combination thereof).

Workpieces that may be processed by the apparatus can be generically characterized as metals, polymers, ceramics, or composites. Specific examples of workpieces that may be processed include, panels of printed circuit boards (PCBs) (also referred to herein as "PCB panels"), PCBs, flexile printed circuits (FPCs), integrated circuits (ICs), IC packages (ICPs), light-emitting diodes (LEDs), LED packages, semiconductor wafers, electronic or optical device substrates (e.g., substrates formed of $Al_2O_3$, AlN, BeO, Cu, GaAS, GaN, Ge, InP, Si, $SiO_2$, SiC, $Si_{1-x}Ge_x$ (where $0.0001<x<0.9999$), or the like, or any combination or alloy thereof), articles formed of plastic, glass (e.g., either unstrengthened, or strengthened thermally, chemically, or otherwise), quartz, sapphire, plastic, silicon, etc., for microfluidic devices, touch sensors, components of electronic displays (e.g., substrates having formed thereon, TFTs, color filters, organic LED (OLED) arrays, quantum dot LED arrays, or the like or any combination thereof), coverslips, lenses, mirrors, screen protectors, etc., turbine blades, powders, films, foils, plates, molds, fabrics (woven, felted, etc.), surgical instruments, medical implants, consumer packaged goods, shoes, bicycles, automobiles, automotive or aerospace parts (e.g., frames, body panels, etc.), appliances (e.g., microwaves, ovens, refrigerators, etc.), device housings (e.g., for watches, computers, smartphones, tablet computers, wearable electronic devices, or the like or any combination thereof). Smartphones are generally understood to include portable electronic devices such as the IPHONE, GALAXY, etc. (manufactured by APPLE, SAMSUNG, etc.). Tablet computers are generally understood to include portable electronic devices such as the IPAD, GALAXY NOTE, NEXUS, XPERIA, etc., (manufactured by APPLE, SAMSUNG, GOOGLE, SONY, etc.). Wearable electronic devices are generally understood to include electronic devices such as the PEBBLE, APPLE WATCH, MOTO 360, SMARTWATCH, GEAR, etc. (manufactured by PEBBLE, APPLE, MOTOROLA, SONY, etc.), which are typically worn on a user's wrist, but may also include electronic devices typically worn on a user's foot, leg, torso, arm, finger, head, ear, etc.

Accordingly, materials that may be processed include one or more metals (e.g., Al, Ag, Au, Cu, Fe, In, Mg, Pt, Sn, Ti, or the like, or combinations or alloys thereof), conductive metal oxides (e.g., ITO, etc.), transparent conductive polymers, ceramics, waxes, resins, inorganic dielectric materials (e.g., used as interlayer dielectric structures, such as silicon oxide, silicon nitride, silicon oxynitride, or the like or any combination thereof), low-k dielectric materials (e.g., methyl silsesquioxane (MSQ), hydrogen silsesquioxane (HSQ), fluorinated tetraethyl orthosilicate (FTEOS), or the like or any combination thereof), organic dielectric materials (e.g., SILK, benzocyclobutene, Nautilus, (all manufactured by Dow), polyfluorotetraethylene, (manufactured by DuPont), FLARE, (manufactured by Allied Chemical), or the like or any combination thereof), glass fibers, polymeric materials (polyamides, polyimides, polyesters, polyacetals, polycarbonates, modified polyphenylene ethers, polybutylene terephthalates, polyphenylene sulfides, polyether sulfones, polyether imides, polyether ether ketones, liquid crystal polymers, acrylonitrile butadiene styrene, and any compound, composite, or alloy thereof), leather, paper, build-up materials (e.g., ANJINOMOTO Build-up Film, also known as "ABF", etc.), glass fiber-reinforced epoxy resin laminates (e.g., FR4), prepregs, or the like or any composite, laminate, or other combination thereof.

Referring to FIG. 1, the laser processing system 100 includes a laser source 102 for generating laser pulses, a beam imaging system 104, a beam positioner 106, a workpiece positioner 108, a scan lens 110, a controller 112 and, optionally, a camera 114. Although not illustrated, the laser processing system 100 also includes one or more optical components (e.g., beam expanders, beam shapers, apertures, harmonic generation crystals, filters, collimators, lenses, mirrors, polarizers, wave plates, diffractive optical elements, or the like or any combination thereof) to focus, expand, collimate, shape, polarize, filter, split, combine, or otherwise modify, condition or direct laser pulses generated by the laser source 102 along one or more beam paths (e.g., beam path 116) extending between the laser source 102 and the scan lens 110. Laser pulses transmitted through the scan lens 110 propagate along a beam axis so as to be delivered to the workpiece 101. Laser pulses are typically delivered so as to be incident upon a region of the workpiece surface 101a that is to be processed. The region that is irradiated by a delivered laser pulse is herein referred to as a "process spot," "spot location" or, more simply, a "spot", and encompasses a region where the beam axis traverses the workpiece 101.

A. Laser Source

In one embodiment, the laser source 102 is operative to generate laser pulses. As such, the laser source 102 may include a pulse laser source, a QCW laser source, or a CW laser source. In the event that the laser source 102 includes a QCW or CW laser source, the laser source 102 may further include a pulse gating unit (e.g., an acousto-optic (AO) modulator (AOM), a beam chopper, etc.) to temporally modulate beam of laser radiation output from the QCW or CW laser source. In another embodiment, the Laser pulses generated by the laser source 102 may be characterized as having one or more wavelengths in one or more of the ultra-violet (UV), visible (e.g., green), infrared (IR), near-IR (NIR), short-wavelength IR (SWIR), mid-wavelength IR (MWIR), or long-wavelength IR (LWIR) ranges of the electromagnetic spectrum, or any combination thereof.

Laser pulses output by the laser source 102 can have a pulse width or duration (i.e., based on the full-width at half-maximum (FWHM) of the optical power versus time) in a range from 30 fs to 900 ms. It will be appreciated, however, that the pulse duration can be made smaller than 30 fs or larger than 900 ms. Thus, at least one laser pulse output by the laser source 102 can have a pulse duration greater than or equal to 10 fs, 15 fs, 30 fs, 50 fs, 100 fs, 150 fs, 200 fs, 300 fs, 500 fs, 700 fs, 750 fs, 850 fs, 900 fs, 1 ps, 2 ps, 3 ps, 4 ps, 5 ps, 7 ps, 10 ps, 15 ps, 25 ps, 500 ps, 1 ns, 1.5 ns, 2 ns, 5 ns, 10 ns, 20 ns, 50 ns, 100 ns, 200 ns, 400 ns, 800 ns, 1000 ns, 2 µs, 5 µs, 10 µs, 50 µs, 100 µs, 300 µs, 500 µs, 900 µs, 1 ms, 2 ms, 5 ms, 10 ms, 20 ms, 50 ms, 100 ms, 300 ms, 500 ms, 900 ms, 1 s, etc. Likewise, at least one laser pulse output by the laser source 102 can have a pulse duration less than 1 s, 900 ms, 500 ms, 300 ms, 100 ms, 50 ms, 20 ms, 10 ms, 5 ms, 2 ms, 1 ms, 300 ms, 900 µs, 500 µs, 300 µs, 100 µs, 50 µs, 10 µs, 5 µs, 1000 ns, 800 ns, 400 ns, 200 ns, 100 ns, 50 ns, 20 ns, 10 ns, 5 ns, 2 ns, 1.5 ns, 1 ns, 500 ps, 25 ps, 15 ps, 10 ps, 7 ps, 5 ps, 4 ps, 3 ps, 2 ps, 1 ps, 900 fs, 850 fs, 750 fs, 700 fs, 500 fs, 300 fs, 200 fs, 150 fs, 100 fs, 50 fs, 30 fs, 15 fs, 10 fs, etc. In one embodiment, laser pulses output by the laser source 102 have a pulse duration in a range from 3 ps to 15 ps. In another embodiment, laser pulses output by the laser source 102 have a pulse duration in a range from 5 ps to 7 ps.

Laser pulses output by the laser source 102 can have an average power in a range from 100 mW to 50 kW. It will be appreciated, however, that the average power can be made smaller than 100 mW or larger than 50 kW. Thus, laser pulses output by the laser source 102 can have an average power greater than or equal to 100 mW, 300 mW, 500 mW, 800 mW, 1 W, 2 W, 3 W, 4 W, 5 W, 6 W, 7 W, 500 W, 2 kW, 3 kW, 20 kW, 50 kW, etc. Likewise, laser pulses output by the laser source 102 can have an average power less than 50 kW, 20 kW, 3 kW, 2 kW, 500 W, 7 W, 6 W, 5 W, 4 W, 3 W, 2 W, 1 W, 800 mW, 500 mW, 300 mW, 100 mW, etc.

Laser pulses can be output by the laser source 102 at a pulse repetition rate in a range from 5 kHz to 1 GHz. It will be appreciated, however, that the pulse repetition rate can be less than 5 kHz or larger than 1 GHz. Thus, laser pulses can be output by the laser source 102 at a pulse repetition rate greater than or equal to 5 kHz, 50 kHz, 100 kHz, 250 kHz, 500 kHz, 800 kHz, 900 kHz, 1 MHz, 2 MHz, 10 MHz, 20 MHz, 50 MHz, 70 MHz, 100 MHz, 150 MHz, 200 MHz, 250 MHz, 300 MHz, 350 MHz, 500 MHz, 550 MHz, 700 MHz, 900 MHz, 2 GHz, 10 GHz, etc. Likewise, laser pulses can be output by the laser source 102 at a pulse repetition rate less than 10 GHz, 2 GHz, 1 GHz, 900 MHz, 700 MHz, 550 MHz, 500 MHz, 350 MHz, 300 MHz, 250 MHz, 200 MHz, 150 MHz, 100 MHz, 90 MHz, 70 MHz, 50 MHz, 20 MHz, 10 MHz, 2 MHz, 1 MHz, 900 kHz, 800 kHz, 500 kHz, 250 kHz, 100 kHz, 50 kHz, 5 kHz, etc. It another embodiment, the laser source 102 can be operated to generate one or more laser pulses on an on-demand basis rather than at any particular pulse repetition rate.

In addition to wavelength, pulse duration, average power and pulse repetition rate, laser pulses delivered to the workpiece 101 can be characterized by one or more other characteristics such as pulse energy, peak power, etc., which can be selected (e.g., optionally based on one or more other characteristics such as wavelength, pulse duration, average power and pulse repetition rate) to irradiate the workpiece 101 at the process spot at an optical intensity (measured in $W/cm^2$), fluence (measured in $J/cm^2$), etc., sufficient to process the workpiece 101 or a component thereof.

In another embodiment, the laser source 102 may be provided as a QCW or CW laser source and not include a pulse gating unit. In such an embodiment, the laser source 102 may generate a continuous laser beam for subsequent propagation along the beam path 116. Thus, the laser source 102 can be broadly characterized as being operative to generate a beam of laser energy, which may manifested as a series of laser pulses or as a continuous laser beam, which can thereafter be propagated along the beam path 116. Although, in many embodiments discussed herein, reference is made to laser pulses, it should be recognized that continuous beams may be employed instead.

Examples of types of lasers that the laser source 102 may be provided as include gas lasers (e.g., carbon dioxide layers, carbon monoxide lasers, excimer lasers, etc.) and solid-state lasers (e.g., Nd:YAG lasers), rod lasers, fiber lasers, photonic crystal rod/fiber lasers, passively mode-locked solid-state bulk or fiber lasers, dye lasers, mode-locked diode lasers, or the like or any combination thereof. Examples of laser sources that may be provided with the laser source 102 include laser sources such as the BOREAS, HEGOA, SIROCCO or CHINOOK series of lasers manufactured by EOLITE, the PYROFLEX series of lasers manufactured by PYROPHOTONICS, the PALADIN Advanced 355 or DIAMOND series lasers manufactured by COHERENT, the GLPN-500-R laser manufactured by IPG PHOTONICS, etc.

B. Beam Imaging System

The spatial intensity distribution of the beam of laser energy input to the beam imaging system 104 (i.e., also referred to herein as an "input spatial intensity distribution") may be characterized as a Gaussian profile, a $sech^2$ profile, a Lorentzian profile, etc., and the beam imaging system 104 is configured to spatially clip, crop, truncate or otherwise modulate the spatial intensity profile of the input beam of laser energy. Thus, the beam of laser energy output by the beam imaging system 104 may be characterized as having a modulated spatial intensity profile that is different from the input spatial intensity distribution.

In some embodiments, the beam imaging system 104 may be provided with one or more imaging components such as an aperture wheel, an iris diaphragm, an optical slit, a spatial light modulator, a mask, or the like or any combination thereof. Optionally, the beam imaging system 104 may include a diffractive optical element (DOE). In one embodiment, however, the laser processing system 100 does not include a DOE. Generally, an aperture wheel may be provided as an opaque disk having a plurality of apertures formed therein, the centers of which are radially-equidistant from a center of the disk. It will be appreciated, however, that an aperture wheel may be configured in any other suitable manner. Iris diaphragms that may be used in the beam imaging system 104 include iris diaphragms configured to define a circular (or at least generally circular) aperture, a square or rectangular aperture, a triangular aperture, or the like or any combination thereof.

Imaging components of the beam imaging system may be driven mechanically (e.g., with a motor, in the case of an aperture wheel, iris diaphragm or other mask) or electronically (e.g., in the case of a spatial light modulator) to modulate the spatial intensity profile of a beam of laser energy incident thereto, thereby outputting a spatially modulated beam of laser energy. For example, an aperture wheel may be mounted (e.g., at its center) on a spindle and rotated in a manner that selectively places an aperture into (or out of) the beam path 116. An iris diaphragm may be may be mounted with the iris centered on the beam path 116 and driven to open, close or otherwise adjust the size of the opening defined by the iris. Optionally, the beam imaging system 104 may be configured to pass the incident beam of laser energy such that the spatial intensity profile of the incident beam of laser energy is unmodulated (or is at least substantially unmodulated).

Generally, the beam imaging system 104 is configured to output a beam of laser energy having a spatial intensity profile (when evaluated in a plane orthogonal to the beam path 116) that is circular or non-circular (e.g., elliptical, square, rectangular, triangular, star-shaped, a broken or otherwise interrupted circle such as multiple partial circles or wedges, or any an arbitrary shape), or any combination thereof. For example, the beam imaging system 104 may include an aperture wheel having at least one circular aperture and at least one non-circular aperture.

In another example, the beam imaging system 104 includes two imaging components disposed, in series, along the beam path 116. In this example, one of the imaging components may include a circular aperture (or be configured to define a circular aperture) and the other of the imaging components may include a non-circular aperture (or be configured to define a non-circular aperture). Alternatively, both imaging components may include circular apertures but may be configured so that, when actuated in response to a calibration command (see below), the centers of the circular apertures defined by the imaging components are not coaxial. In this state, the circular apertures modulate the spatial intensity distribution profile of an incident beam of laser energy to output a beam of laser energy having a non-circular, bi-convex spatial intensity distribution profile.

In another example, the beam imaging system 104 includes two imaging components disposed, in series, along the beam path 116. In this example, one of the imaging components may include a circular aperture (or be configured to define a circular aperture) and the other of the imaging components may include a non-circular aperture (or be configured to define a non-circular aperture).

C. Beam Positioner

The beam positioner 106 is operative to diffract, reflect, refract, or the like, or any combination thereof, the beam of laser energy propagating along the beam path 116 from the output of the beam imaging system 104 so as to impart movement of the beam path 116 relative to the scan lens 110. Generally, the beam positioner 106 is configured to impart movement of the beam axis relative to the workpiece 101 along X- and Y-axes (or directions) such that process spots can be scanned, moved or otherwise positioned within a scan field that is projected onto the workpiece 101 (e.g., from the scan lens 110). Although not illustrated, the X-axis (or X-direction) will be understood to refer to an axis (or direction) that is orthogonal to the illustrated Y- and Z-axes (or directions).

The beam positioner 106 can be provided as a micro-electro-mechanical-system (MEMS) mirror or mirror array, an AO deflector (AOD) system, an electro-optic deflector (EOD) system, a fast-steering mirror (FSM) element (e.g., incorporating a piezoelectric actuator, electrostrictive actuator, voice-coil actuator, etc.), a galvanometer mirror system (e.g., including two galvanometer mirror components, where one galvanometer mirror component is arranged to impart movement of the beam axis relative to the workpiece 101 along the X-direction and another galvanometer mirror component is arranged to impart movement of the beam axis relative to the workpiece 101 along the Y-direction), or the like or any combination thereof.

D. Workpiece Positioner

The workpiece positioner 108 is operative to move the workpiece 101 relative to the scan lens 110 in the X-, Y- and/or Z-directions. Thus, to the extent that the workpiece positioner 108 moves the workpiece 101 in the X- and/or Y-directions, the workpiece positioner 108 is configured to move different regions of the workpiece 101 into and out the scan field projected by the scan lens 110. In one embodiment, the workpiece positioner 108 is provided as one or more linear stages (e.g., each capable of imparting translational movement to the workpiece 101 along the X-, Y- and/or Z-directions), one or more rotational stages (e.g., each capable of imparting rotational movement to the workpiece 101 about an axis parallel to the X-, Y- and/or Z-directions), or the like or any combination thereof. In one embodiment, the workpiece positioner 108 includes an X-stage for moving the workpiece 101 along the X-direction, and a Y-stage supported by the X-stage (and, thus, moveable along the X-direction by the X-stage) for moving the workpiece 101 along the Y-direction. The laser processing system 100 may optionally include a chuck (not shown) coupled to the workpiece positioner 108, to which the workpiece 101 can be clamped, fixed, held, secured or be otherwise supported. Although not shown, the laser processing system 100 may also include an optional base that supports the workpiece positioner 108.

As described thus far, the laser processing system 100 employs a so-called "stacked" positioning system, in which positions of the components such as the beam positioner 106, scan lens 110, etc., are kept stationary within the laser processing system 100 (e.g., via one or more supports, frames, etc., as is known in the art) relative to the workpiece 101, which is moved via the workpiece positioner 108. In another embodiment, and although not shown, one or more supplemental positioners (e.g., one or more linear, rotational stages, or the like or any combination thereof) may be provided to move one or more components such as the beam positioner 106, scan lens 110, etc., and the workpiece 101 may be kept stationary (in which case, the workpiece positioner 108 may be omitted).

In yet another embodiment, the laser processing system 100 can employ a split-axis positioning system in which one or more components such as the beam positioner 106, scan lens 110, etc., are positioned by one or more supplemental positioners (not shown). In such an embodiment, one or more linear or rotational stages are arranged and configured to move one or more components such as the beam positioner 106, second positioner 108, scan lens 110, etc., and the workpiece positioner 108 is arranged and configured to move the workpiece 101. Some examples of split-axis positioning systems that may be beneficially or advantageously employed in the laser processing system 100 include any of those disclosed in U.S. Pat. Nos. 5,751,585, 5,798,927, 5,847,960, 6,706,999, 7,605,343, 8,680,430, 8,847,113, or in U.S. Patent App. Pub. No. 2014/0083983, or any combination thereof, each of which is incorporated herein by reference in its entirety.

In another embodiment, one or more components such as the beam positioner 106, scan lens 110, etc., may be carried by an articulated, multi-axis robotic arm (e.g., a 2-, 3-, 4-, 5-, or 6-axis arm). In such an embodiment, the beam positioner 106 and/or scan lens 110 may, optionally, be carried as an end effector of the robotic arm. In yet another embodiment, the workpiece 101 may be carried directly on an end effector of an articulated, multi-axis robotic arm (i.e., without the workpiece positioner 108). In still another embodiment, the workpiece positioner 108 may be carried on an end effector of an articulated, multi-axis robotic arm.

D. Scan Lens

The scan lens 110 (e.g., provided as either a simple lens, or a compound lens) is generally configured to focus laser energy directed along the beam path 116, so as to produce a beam waist. The scan lens 110 may be provided as an f-theta lens, a telecentric lens, an axicon lens, or the like or any combination thereof. In one embodiment, the scan lens 110 is provided as a fixed-focal length lens and is coupled to a lens actuator (not shown) configured to move the scan lens 110 (e.g., so as to change the position of the beam waist along the beam axis). For example, the lens actuator may be provided as a voice coil configured to linearly translate the scan lens 110 along the Z-direction. In another embodiment, the scan lens 110 is provided as a variable-focal length lens (e.g., a zoom lens, or a so-called "liquid lens" incorporating technologies currently offered by COGNEX, VARIOPTIC, etc.) capable of being actuated (e.g., via a lens actuator) to change the position of the beam waist along the beam axis.

E. Controller

Generally, the controller 112 is communicatively coupled (e.g., over one or more wired or wireless communications links, such as USB, Ethernet, Firewire, Wi-Fi, RFID, NFC, Bluetooth, Li-Fi, or the like or any combination thereof) to one or more components of the laser processing system 100, such as the laser source 102, the beam positioner 106, workpiece positioner 108, the lens actuator, etc., and are thus operative in response to one or more control signals output by the controller 112.

Generally, the controller 112 includes one or more processors configured to generate the control signals upon executing instructions. A processor can be provided as a programmable processor (e.g., including one or more general purpose computer processors, microprocessors, digital signal processors, or the like or any combination thereof) configured to execute the instructions. Instructions executable by the processor(s) may be implemented software, firmware, etc., or in any suitable form of circuitry including programmable logic devices (PLDs), field-programmable gate arrays (FPGAs), field-programmable object arrays (FPGAs), application-specific integrated circuits (ASICs)—including digital, analog and mixed analog/digital circuitry— or the like, or any combination thereof. Execution of instructions can be performed on one processor, distributed among processors, made parallel across processors within a device or across a network of devices, or the like or any combination thereof.

In one embodiment, the controller 112 includes tangible media such as computer memory, which is accessible (e.g., via one or more wired or wireless communications links) by the processor. As used herein, "computer memory" includes magnetic media (e.g., magnetic tape, hard disk drive, etc.), optical discs, volatile or non-volatile semiconductor memory (e.g., RAM, ROM, NAND-type flash memory, NOR-type flash memory, SONOS memory, etc.), etc., and may be accessed locally, remotely (e.g., across a network), or a combination thereof. Generally, the instructions may be stored as computer software (e.g., executable code, files, instructions, etc., library files, etc.), which can be readily authored by artisans, from the descriptions provided herein, e.g., written in C, C++, Visual Basic, Java, Python, Tel, Perl, Scheme, Ruby, etc. Computer software is commonly stored in one or more data structures conveyed by computer memory.

Although not shown, one or more drivers (e.g., RF drivers, servo drivers, line drivers, power sources, etc.) can be communicatively coupled to an input of one or more components such as the laser source 102, the beam positioner 106, the second positioner 108, the workpiece positioner 108, the lens actuator, etc. In one embodiment, each driver typically includes an input to which the controller 112 is communicatively coupled and the controller 112 is thus operative to generate one or more control signals (e.g., trigger signals, etc.), which can be transmitted to the input(s) of one or more drivers associated with one or more components of the laser processing system 100. Thus, components such as the laser source 102, the beam positioner 106, the second positioner 108, third positioner, the lens actuator, etc., are responsive to control signals generated by the controller 112.

In another embodiment, and although not shown, one or more additional controllers (e.g., component-specific controllers) may, optionally, be communicatively coupled to an input of a driver communicatively coupled to a components (and thus associated with the component) such as the laser source 102, the beam positioner 106, the workpiece positioner 108, the lens actuator, etc. In this embodiment, each component-specific controller can be communicatively coupled and the controller 112 and be operative to generate, in response to one or more control signals received from the controller 112, one or more control signals (e.g., trigger signals, etc.), which can then be transmitted to the input(s) of the driver(s) to which it is communicatively coupled. In this embodiment, a component-specific controller may be configured as similarly described with respect to the controller 112.

In another embodiment in which one or more component-specific controllers are provided, the component-specific controller associated with one component (e.g., the laser source 102) can be communicatively coupled to the component-specific controller associated with one component (e.g., the beam positioner 106, etc.). In this embodiment, one or more of the component-specific controllers can be operative to generate one or more control signals (e.g., trigger signals, etc.) in response to one or more control signals received from one or more other component-specific controllers.

E. Camera

When included in the laser processing system 100, the camera 114 is generally configured to capture imagery of the workpiece 101 and transmit image data, representative of the captured imagery, to the controller 112. The camera 114 may be provided as a digital camera (e.g., a CCD camera, a CMOS camera, or the like or any combination thereof), and may be configured and arranged such that a field of view of the camera 114 lies completely outside the scan field. In another embodiment, the camera 114 is configured and arranged such that the field of view of the camera 114 lies completely within the scan field. In yet another embodiment, the camera 114 is configured and arranged such that the field of view of the camera 114 lies only partially within the scan field. When the field of view of the camera 114 lies completely outside the scan field (or only partially within the scan field), the workpiece positioner 108 may be configured to position any region of the workpiece 101, which is capable of being positioned within the scan field, within the field of view of the camera 114.

III. Embodiments Concerning Image Plane Location

When the workpiece surface 101a is located at an image plane associated with one or more imaging components (e.g., one or more apertures, masks, etc.) of the beam imaging system 104, the shape of the process spot illuminated at the workpiece surface 101a will be the same as (or at least resemble) the shape of the beam of laser energy output by the beam imaging system 104. Generally, the image plane is located during a pre-processing or calibration step. After the image plane is located, the laser processing system 100 is adjusted to fix the workpiece surface 101a at the image plane and the workpiece 101 is processed as desired.

To locate the image plane, the user runs an experiment by processing the workpiece 101 to form multiple test patterns therein (e.g., by delivering an imaged beam of laser energy to one or more process spots at the workpiece 101). Generally, characteristics of the delivered beam of laser energy are selected or otherwise set so as to ablate, melt, discolor, etc., the workpiece 101 (or a component thereof) at or around the process spot. During the image plane-location process, an operation of the beam imaging system 104 is controlled (e.g., manually or via the controller 112) to pass a beam of laser energy having a modulated spatial intensity profile (also referred to herein as a "test spatial intensity profile") that is non-circular in shape (e.g., when viewed in a plane that is orthogonal to the beam path 116). The test spatial intensity profile may have any suitable non-circular shape (e.g., elliptical, square, rectangular, triangular, crescent-shaped, semicircular, arbelos-shaped, star-shaped, etc., or any arbitrary shape). Thereafter, operations of the laser source 102 and one or more of the beam positioner 106 and the workpiece positioner 108 are controlled (e.g., by the controller 112) to form a test pattern in the workpiece 101.

During the image plane-location process, multiple test patterns are formed, each at a different distance between the workpiece surface 101a and the scan lens 110 (also referred to herein as a "process distance"). The process distance may be adjusted (either incrementally or otherwise) by actuating or controlling an operation of the workpiece positioner 108, a supplemental positioner, or any combination thereof (e.g., manually or via the controller 112) to re-position the workpiece 101, the scan lens 110, or a combination thereof, along the Z-axis before each test pattern is formed. In one embodiment, the process distance may be adjusted over a distance of 2 mm, over a distance of 1.5 mm, over a distance of 1.2 mm, over a distance of 1 mm, over a distance of 0.5 mm, or the like. Thus, test patterns can be characterized as being formed in the workpiece 101, over a set of processing distances that include, or are otherwise offset from, a reference distance. As used herein, a "reference distance" can refer to the working distance of the scan lens 110 (i.e., the distance between the front edge of the scan lens 110 and the workpiece surface 101a when the workpiece surface 101a is at the focal plane of the scan lens 110), the focal length of the camera 114, a distance between the scan lens 110 and the workpiece surface 101a (e.g., as recorded by a distance sensor, a touch-down sensor, etc.), or the like, or can otherwise be derived therefrom.

Generally, each test pattern is formed at a different region of the workpiece 101 to facilitate subsequent visual analysis and comparison thereof. In one embodiment, the region where each test pattern is formed corresponds to the sequence with which the test pattern is formed during the image plane-location process. For example, test patterns formed during the image plane-location process may be arranged within an m×n array of workpiece regions (where m and n are integers, m≥1 and n>1, and individual regions are identified by the ordered pair (m,n)), and the first test pattern may be formed at region (1,1) of the array, the second test pattern may be formed at region (1,2) of the array, etc. Thus, the location of a particular test pattern within the array is indicative of a particular process distance.

In one embodiment, the user may execute an image plane-location process (e.g., by providing an instruction to do so via a user input device—not shown—communicatively coupled to the controller 112). The user input device may be a keyboard, a computer mouse, a touchscreen, etc. Upon receiving an instruction from the user, the controller 112 may control an operation of one or more of the laser source 102, the beam imaging system 104, the beam positioning system 106, the workpiece positioning system 108, one or more supplemental positioners, or the like or any combination thereof, to form multiple test patterns in the workpiece 101. Often, these reference distances will be a few millimeters away (at most) from the image plane.

After forming the plurality of test patterns, the user may inspect the test patterns (e.g., visually) to determine which test pattern contains a feature having a shape that most closely resembles the non-circular shape of the aperture selected in the beam imaging system 104. Generally, the shape of the process spot illuminated on the workpiece surface 101a (and, thus, the shape of the feature formed in the workpiece 101) will closely resemble the shape of the test spatial intensity profile if the feature was formed when the workpiece surface 101a was contained in the image plane of the aperture. If the workpiece surface 101a is located far away from the image plane, the shape of the process spot (and, thus, the shape of the feature formed in the workpiece 101) will not closely resemble the shape of the test spatial intensity profile. In some cases, the shape of a process spot illuminated on a workpiece surface 101a located sufficiently far away from the image plane (and, thus, the shape of the feature formed in the workpiece 101) is circular—irrespective of the shape of the test spatial intensity profile. By evaluating the shape of the process spot or the shape of the feature formed at the process spot, the image plane of the aperture can be easily and quickly located, without the need to simulate the beam profile or estimate Δz as described above.

Once the test pattern containing the feature having the shape most closely resembling the non-circular shape of the selected aperture is identified, the user can set the process distance by actuating or otherwise controlling an operation of the workpiece positioner 108, a supplemental positioner, or any combination thereof (e.g., manually or via the controller 112) to re-position the workpiece 101, the scan lens 110, or a combination thereof, along the Z-axis to place the workpiece surface 101a within the image plane of the beam imaging system 104. Thereafter, an operation of the beam imaging system 104 can be controlled (e.g., via the controller 112) to pass a beam of laser energy having an unmodulated spatial intensity profile or a modulated spatial intensity profile (also herein referred to as a "process spatial intensity profile") that is different from the test modulated spatial intensity profile. Generally, the process spatial intensity profile will be circular, but may alternatively be non-circular (e.g., elliptical, square, rectangular, triangular, crescent-shaped, semicircular, arbelos-shaped, star-shaped, etc., or any arbitrary shape, etc.), so long as the process spatial intensity profile is different from the test spatial intensity profile. In another embodiment, however, the process spatial intensity profile may be the same as the test spatial intensity profile. Thereafter, operations of the laser source 102 and one or more of the beam positioner 106 and the workpiece positioner 108 are controlled (e.g., by the controller 112) to process the workpiece 101, having the workpiece surface 101a placed in the image plane. Exemplary processes that may be performed include percussion drilling techniques (e.g., employing a single laser pulse or multiple laser pulses to drill a via in a workpiece such as a PCB).

As discussed above, the user is charged with the responsibility for visually inspecting test patterns formed during the image plane-locating process. In another embodiment, visual inspection may be performed algorithmically. For example, the camera 114 may capture imagery of the test patterns and generate image data, representative of the captured imagery. The image data may be transmitted to the controller 112 and processed there to determine which test pattern contains a feature having a shape that most closely resembles that of the aperture set in the beam imaging system 104 during the image plane-locating process. Image data may be processed in any suitable manner to do so. Exemplary processing techniques that may be employed include Scale-Invariant Feature Transform (SIFT), Speeded-Up Robust Features (SURF), Gradient Location and Orientation Histogram (GLOH), Histogram of Oriented Gradients (HOG), or the like or any combination thereof. The location of the test pattern (e.g., within an array such as the m×n array, discussed above) having a feature with a shape most closely resembling the aperture set in the beam imaging system 104 is identified, and the processing distance associated with the identified location is set (e.g., by the controller 112) as the distance from the scan lens 110 where the image plane is located. The controller 112 can then control an operation of the workpiece positioner 108, a supplemental positioner, or any combination thereof to re-position the workpiece 101, the scan lens 110, or a combination thereof, to place the workpiece surface 101a within the image plane of the beam imaging system 104.

In the embodiments above, the workpiece 101 that is initially processed during the calibration step is the same workpiece 101 that is processed after the calibration step (e.g., to drill a via therein, etc.). In another embodiment, however, the workpiece 101 (also referred to herein as a "calibration workpiece") that was initially processed during the calibration step can be removed from the workpiece positioner 108 and a new workpiece 101 (also referred to herein as a "process workpiece") can be mounted onto the workpiece positioner 108 for processing (e.g., to drill a via therein). In this embodiment, the calibration workpiece is of the same (or at least substantially the same) thickness as the process workpiece, or the thicknesses of the calibration and process workpieces are different. If the thickness of the process workpiece is different from the thickness of the calibration workpiece, the workpiece positioner 108, a supplemental positioner, or any combination thereof can be actuated or otherwise controlled (e.g., manually or via the controller 112) to re-position the process workpiece 101, the scan lens 110, or a combination thereof, along the Z-axis to compensate for the difference in thickness and place the workpiece surface 101a of the process workpiece within the image plane of the beam imaging system 104.

In view of the above, it should be recognized that the laser processing system and image plane-location process discussed above provide numerous advantages. For example, the image plane-location process looks for the image plane directly, eliminating the need to find the plane of minimum spot size. Finding the plane of minimum spot size for a circular spot is only an intermediate step, and the process of finding such a minimum spot size is somewhat subjective—not only because the shape of a feature formed in ablation crater doesn't change much, but also because geometric characteristics of feature (e.g., size, depth, etc.) also depends on the laser energy. It saves time and reduces error to simply look for the image plane directly. Because the image plane is located directly, there is no need to perform complicated and time-consuming simulations of the beam profile to estimate $\Delta z$.

IV. Conclusion

The foregoing is illustrative of embodiments and examples of the invention, and is not to be construed as limiting thereof. Although a few specific embodiments and examples have been described with reference to the drawings, those skilled in the art will readily appreciate that many modifications to the disclosed embodiments and examples, as well as other embodiments, are possible without materially departing from the novel teachings and advantages of the invention. Accordingly, all such modifications are intended to be included within the scope of the invention as defined in the claims. For example, skilled persons will appreciate that the subject matter of any sentence, paragraph, example or embodiment can be combined with subject matter of some or all of the other sentences, paragraphs, examples or embodiments, except where such combinations are mutually exclusive. The scope of the present invention should, therefore, be determined by the following claims, with equivalents of the claims to be included therein.

What is claimed is:

1. A method of processing a workpiece using a laser processing system having a scan lens, the method, comprising:
    processing a first workpiece using a first beam of laser energy, wherein the first beam of laser energy irradiates a spot on the first workpiece, wherein the spot irradiated on the first workpiece has a first shape, wherein the first shape is a non-circular shape, wherein the processing includes forming a plurality of features in the first workpiece, wherein a first distance between the scan lens and the first workpiece during the forming of one of the plurality of features is different from a second distance between the scan lens and the first workpiece during the forming of another of the plurality of features;
    determining which of the plurality of features has a shape that most closely resembles the first shape;
    setting a process distance as the distance between the scan lens and the first workpiece during the forming of the feature having the shape that most closely resembles the first shape;
    determining an image plane as a plane at the process distance from the scan lens to a plane orthogonal to the path along which the beam of laser energy propagates;
    disposing a surface of a second workpiece at least substantially at the image plane; and
    processing the surface of the second workpiece using a second beam of laser energy, wherein the second beam of laser energy irradiates a spot on the surface that has a second shape different from the first shape.

2. The method of claim 1, wherein the second shape is circular.

3. The method of claim 1, wherein the first shape is one selected from the group consisting of elliptical, square, rectangular, triangular, crescent-shaped, semicircular, arbelos-shaped, and star-shaped.

4. The method of claim 1 wherein determining which of the plurality of features has a shape that most closely resembles the first shape further comprises:
    capturing imagery of the plurality of features and generating image data, representative of the captured imagery;
    transmitting the image data to a controller; and,
    processing the image data by the controller.

5. The method of claim 4 further comprising capturing the imagery using a camera.

6. An apparatus for laser processing a substrate comprising:
    a laser source;
    a beam imaging system, adapted to produce, from an optical output of the laser source, a first beam of laser energy characterized by a first spatial intensity distribution having a non-circular perimeter shape at the focal point of the beam when viewed in a plane that is orthogonal to a path along which the beam of laser energy propagates and adapted to produce a second beam of laser energy to form a modulated beam of laser energy characterized by a second spatial intensity distribution different from the first spatial intensity distribution;
    a scan lens;
    a workpiece positioner adapted to support a workpiece such that the distance orthogonal from the workpiece positioner to the scan lens is variable;
    a camera adapted to capture imagery of a feature formed in the workpiece and generate image data representative of the captured imagery; and
    a controller communicatively connected to the camera, the workpiece positioner and the beam imaging system, wherein the controller is operative to:
        process the image data to determine if the feature has a shape that sufficiently resembles the shape of the first spatial intensity distribution; and
        if the shape of the feature sufficiently resembles the shape of the first spatial intensity distribution:
            set a process distance as the distance between the scan lens and the workpiece;
            control an operation of the workpiece positioner to dispose a surface of a workpiece at the process distance; and
            control an operation of the beam imaging system to produce, from the optical output of the laser source, second beam of laser energy.

7. The apparatus of claim 6, wherein the second spatial intensity distribution is circular.

8. The apparatus of claim 6, wherein the first spatial intensity distribution is one selected from the group consisting of elliptical, square, rectangular, triangular, crescent-shaped, semicircular, arbelos-shaped, and star-shaped.

9. A method of processing a workpiece using a laser processing system having a scan lens, the method, comprising:
    processing a workpiece using a first beam of laser energy, wherein the first beam of laser energy irradiates a spot on the workpiece, wherein the spot has a first shape, wherein the first shape is a non-circular shape, wherein the processing includes forming a plurality of features in the workpiece, wherein a first distance between the scan lens and the workpiece during the forming of one of the plurality of features is different from a second distance between the scan lens and the workpiece during the forming of another of the plurality of features;

determining which of the plurality of features has a shape that most closely resembles the first shape;

setting a process distance as the distance between the scan lens and the first workpiece during the forming of the feature having the shape that most closely resembles the first shape;

determining an image plane as a plane at the process distance from the scan lens to a plane orthogonal to the path along which the beam of laser energy propagates;

disposing a surface of the workpiece at least substantially at the image plane; and processing the surface of the workpiece using a second beam of laser energy, wherein the second beam of laser energy irradiates a spot on the surface that has a second shape different from the first shape.

10. The method of claim 9, wherein the second shape is circular.

11. The method of claim 9, wherein the first shape is one selected from the group consisting of elliptical, square, rectangular, triangular, crescent-shaped, semicircular, arbelos-shaped, and star-shaped.

12. The method of claim 9 wherein determining which of the plurality of features has a shape that most closely resembles the first shape further comprises:

capturing imagery of the plurality of features and generating image data, representative of the captured imagery;

transmitting the image data to a controller; and, processing the image data by the controller.

13. The method of claim 12 further comprising the capturing the imagery using a camera.

* * * * *